Feb. 5, 1924.
M. H. HEINICKE
SPRING WHEEL
Filed Feb. 20, 1923
2 Sheets-Sheet 1
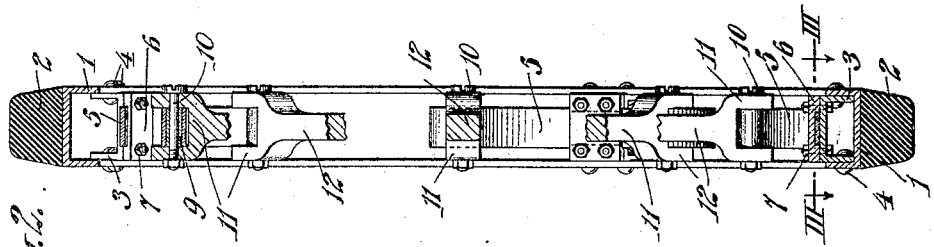
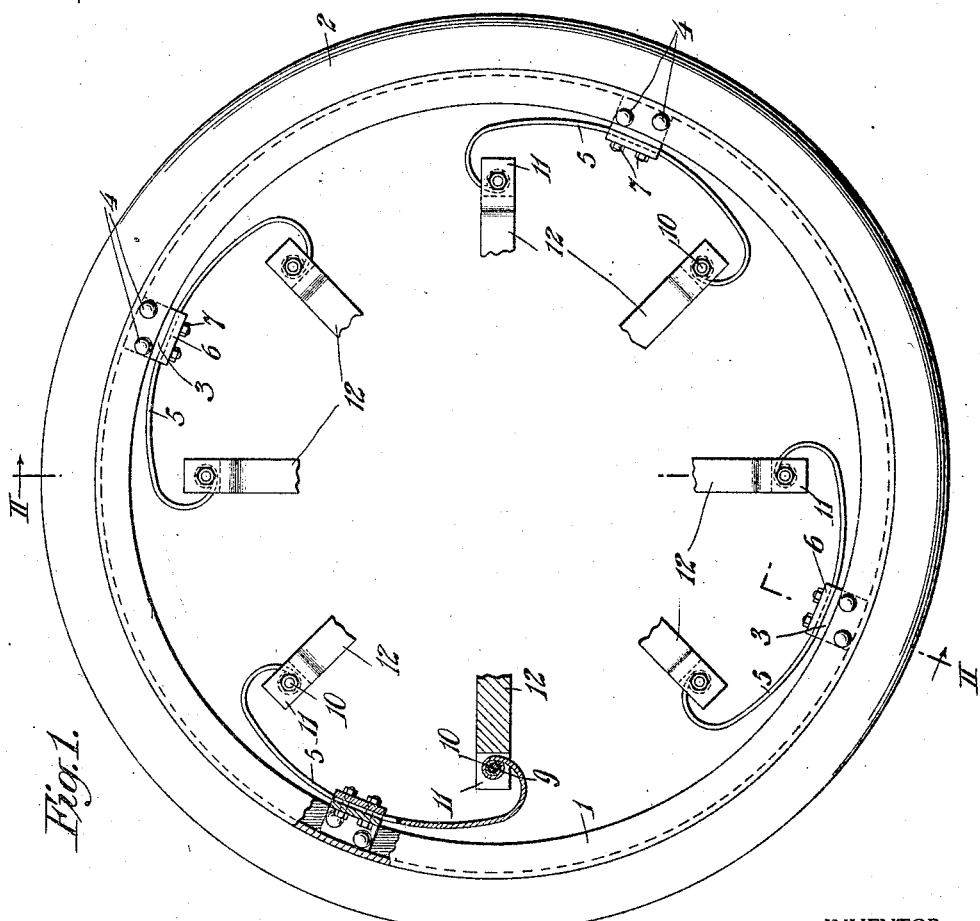
INVENTOR
Milton H. Heinicke
BY
his ATTORNEYS Feb. 5, 1924. 1,482,746
M. H. HEINICKE
SPRING WHEEL
Filed Feb. 20, 1923 2 Sheets-Sheet 2
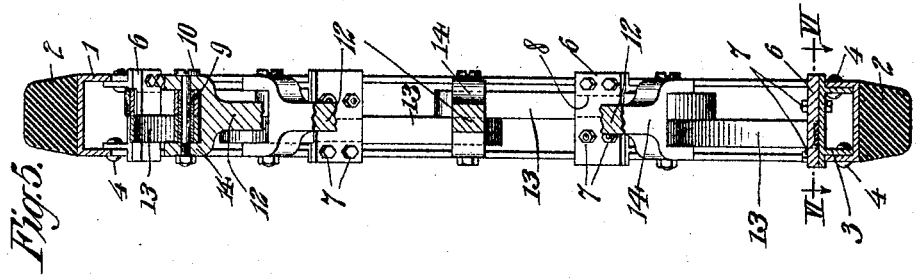
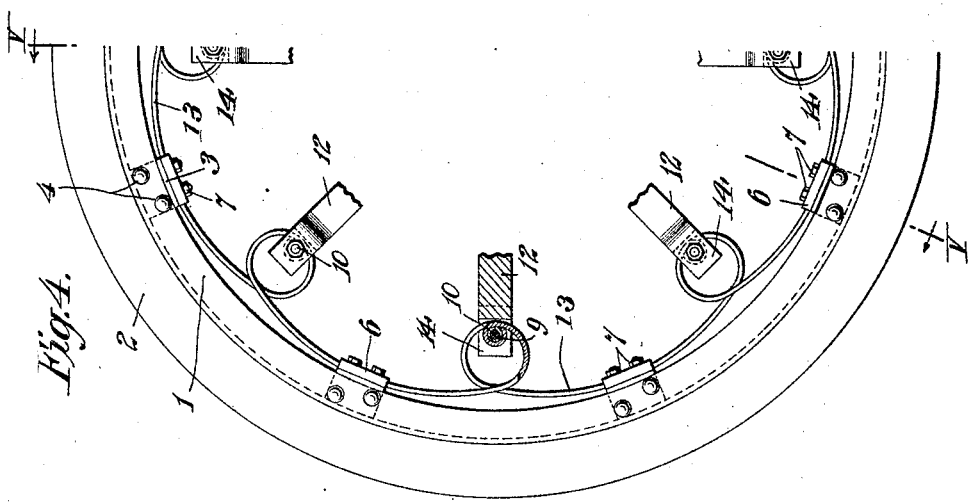
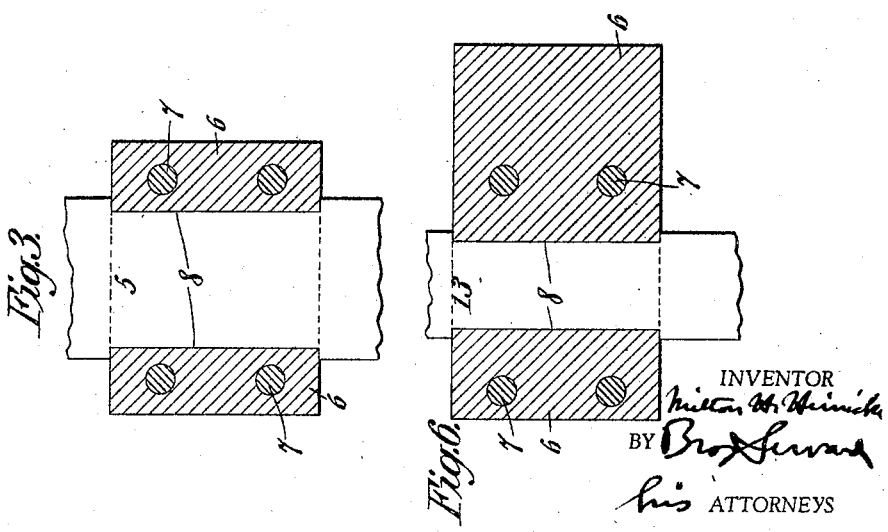
INVENTOR
BY
his ATTORNEYS Patented Feb. 5, 1924.

1,482,746

UNITED STATES PATENT OFFICE.

MILTON H. HEINICKE, OF PORT IVORY, NEW YORK.

SPRING WHEEL.

Application filed February 20, 1923. Serial No. 620,253.

*To all whom it may concern:*

Be it known that I, MILTON H. HEINICKE, a citizen of the United States, and resident of Port Ivory, in the county of Richmond and State of New York, have invented a new and useful Improvement in Spring Wheels, of which the following is a specification.

This invention relates to a spring wheel for vehicles, and has for an object to provide an article of this character which includes means for supplying adequate resiliency even though a solid tire, such as hard rubber, fibre, etc., be employed.

Another object consists in providing such an article which is unusually well adapted for taking up shocks engendered when the moving vehicle meets an obstruction, such as a sudden depression or elevation in the roadway. In the use of pneumatic tires, such shocks are partially absorbed by the tires, but are largely transmitted to the vehicle. In a case of ordinary wheels having solid tires, the shock is only very little taken up by the tire and is very largely transmitted to the vehicle. These shocks cause excessive wear on axles, bearings and the like, since the blow momentarily displaces the films of lubricating oil and permits the surfaces of metal to injuriously contact and rub upon each other. The shocks also injure the vehicle through vibration.

Another object consists in providing such an article which is very efficient in absorbing side strains such, for instance, as those set up when the vehicle turns a corner.

Another object consists in providing such an article in which the resilient spring at the bottom of the wheel is under compression and the corresponding spring at the top of the wheel is under tension, and in which the top scrolls of the resilient springs, lying in vertical positions at this time, are under tension and the bottom scrolls of said springs under compression.

Another object consists in providing such an article, which will permit the lowering of the body of the vehicle, and thereby the lowering of its center of gravity, with beneficial results.

Another object consists in providing such an article, which will permit the front and rear axles to be rigidly connected, thereby making an exceptionally strong construction.

Another object consists in providing such an article, which will eliminate the necessity of employing flexible connections, such as universal joints, between the transmission gearing and the differential gearing.

A further object consists in providing certain improvements in the form, construction and arrangement of the several parts whereby the above named and other objects may be effectively attained.

Two practical embodiments are represented in the accompanying drawings, in which Fig. 1 represents a side view, partly broken away, of the wheel.

Fig. 2 represents a section taken in the plane of the line II—II of Fig. 1, looking in the direction of the arrows.

Fig. 3 represents, on an enlarged scale, a detail section taken in the plane of the line III—III of Fig. 2, looking in the direction of the arrows.

Fig. 4 represents a view similar to Fig. 1, but showing a modified form.

Fig. 5 represents a section taken in the plane of the line V—V of Fig. 3, looking in the direction of the arrows.

Fig. 6 represents, on an enlarged scale, a detail section taken in the plane of the line VI—VI of Fig. 5, looking in the direction of the arrows.

The wheel includes a felly denoted by 1. which is composed of suitable material of proper strength and lightness, such, for instance, as channel iron. The side edges of the channel iron project inwardly. as clearly shown in Fig. 2. On the outer flat surface of the felly is mounted a tire 2, which may be composed of solid rubber and secured in position by a suitable vulcanizing operation well understood in the art.

At intervals around the felly 1 there are fastened a number. in the present instance four, saddles 3, which are also composed of channel iron and of such size as to have their sides slidably fit within the felly 1. The saddles are secured to the felly 1, in this position, by suitable rivets 4, and it will be observed that the flat faces of the saddles are exposed toward the axis of the wheel.

A plurality of double scroll springs 5 have their center portions mounted on the faces of the saddles 3 and are secured in position thereon by U-clamps 6 which are fastened to the saddles 3 by bolts 7. In order to secure the springs 5 against any longitudinal movement on the saddles, I prefer to slightly cut away the side edges of the springs as shown at 8 and to arrange the U-clamps 6 so as to fit in the said cut away portions.

Each end of the springs 5 is developed into a scroll which finally terminates in a circular bearing in which is fitted a sleeve or liner 9 that is adapted to receive a bolt 10 which passes through apertures formed in bifurcations 11, fashioned at the end of each wheel spoke 12. It will be noted that each spring 5 is thus engaged with two spokes so that, in the case of a wheel with eight spokes, there will be four springs; in the case of a wheel with ten spokes there will be five springs, and so on.

The spokes 5 may be carried by any suitable form of hub adapted for mounting upon any desired vehicle axle. As this portion of the wheel constitutes no part of my invention, the same is not shown or described.

Referring to the modified form shown in Figs. 4, 5 and 6, all parts are the same except that I provide as many springs 5 as there are spokes 12, and engage an end of each of two springs with each spoke. The said ends of the springs are arranged to lie side by side within the bifurcations, denoted in this form by 14, as clearly shown in Fig. 4, and the bolt 10 passes through both of said ends in order to hold them in position.

In operation; referring to both forms, all shocks will be taken up by the springs, the arrangement being such that the axle of the vehicle will, so to speak, float within the felly 1. Under normal conditions the spring at the bottom of the wheel will be under compression and the spring at the top under tension. The clearance between the spokes and the felly is such as to permit a very substantial movement of the vehicle axle within the latter. In case a side strain is engendered as, for instance, when the vehicle is turning a corner, it will tend to twist one or more of the springs and thus be strongly resisted owing to the great force required to distort the springs in the direction of their width.

The modified form shown in Figs. 4, 5 and 6 operates in the same manner as the preferred form shown in Figs. 1, 2 and 3.

I desire it to be understood that various changes may be resorted to in the form, construction and arrangement of the several parts without departing from the spirit and scope of my invention; hence that the same is not to be limited to the details herein shown and described, except as they are included in the claims.

What I claim is:—

1. A spring wheel comprising, a felly, spokes, and semi-elliptic springs provided with scrolls at each end connecting the felly and spokes.

2. A spring wheel comprising, a felly, spokes, and semi-elliptic springs provided with scrolls at each end connecting the felly and spokes, each spring being engaged with a plurality of spokes.

3. A spring wheel comprising, a felly, rigid spokes, and semi-elliptic springs provided with scrolls at each end connecting the felly and spokes.

4. A spring wheel comprising, a felly, rigid spokes, and semi-elliptic springs provided with scrolls at each end connecting the felly and spokes, each spring being engaged with a plurality of spokes.

5. A spring wheel comprising, a channel iron felly, spokes, saddles secured to the felly, and semi-elliptic springs provided with scrolls at each end connecting the felly and spokes.

6. A spring wheel comprising, a channel iron felly, spokes, saddles secured to the felly, and semi-elliptic springs mounted on said saddles and provided with scrolls at each end connecting the felly and spokes, each spring being engaged with a plurality of spokes.

7. A spring wheel comprising, a channel iron felly, rigid spokes, saddles secured to the felly, and semi-elliptic springs mounted on said saddles and provided with scrolls at each end connecting the felly and spokes.

8. A spring wheel comprising, a channel iron felly, rigid spokes, saddles secured to the felly, and semi-elliptic springs mounted on said saddles and provided with scrolls at each end connecting the felly and spokes, each spring being engaged with a plurality of spokes.

9. A spring wheel comprising, a felly, rigid spokes, saddles secured to the felly, semi-elliptic springs provided with scrolls at each end connecting the felly and spokes, said springs being secured to the saddles by clamps which straddle the springs, and each spring being engaged with a plurality of spokes.

In testimony, that I claim the foregoing as my invention, I have signed my name this 6th day of February 1923.

MILTON H. HEINICKE.